J. O. & W. P. SCHIRMER.
FLUID TRANSMISSION OR DRIVING MECHANISM.
APPLICATION FILED SEPT. 6, 1918.
1,292,091.
Patented Jan. 21, 1919.
4 SHEETS—SHEET 3.
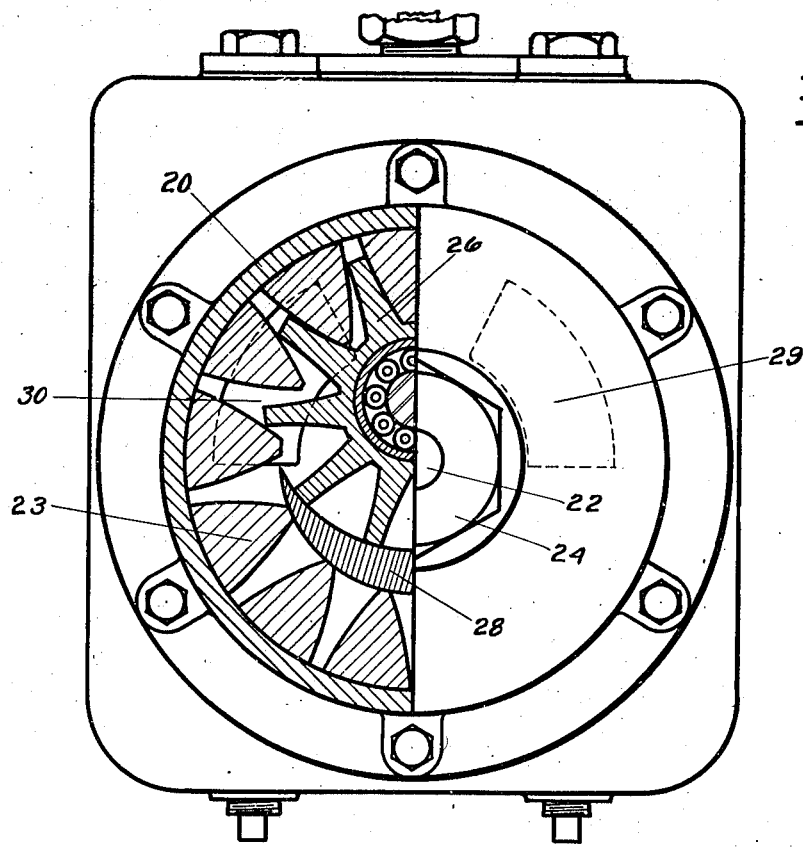
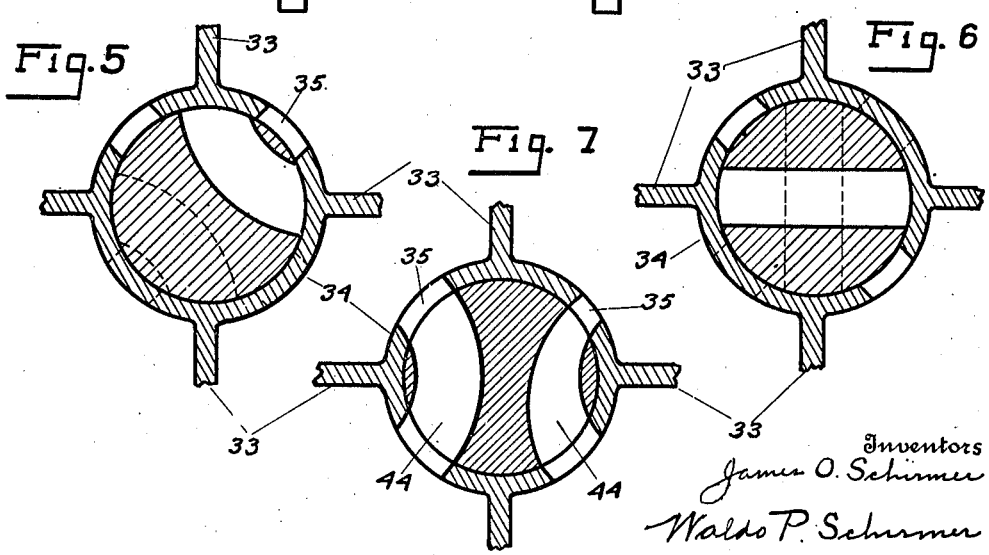
Inventors
James O. Schirmer
Waldo P. Schirmer
By John A. Bommhardt
Attorney

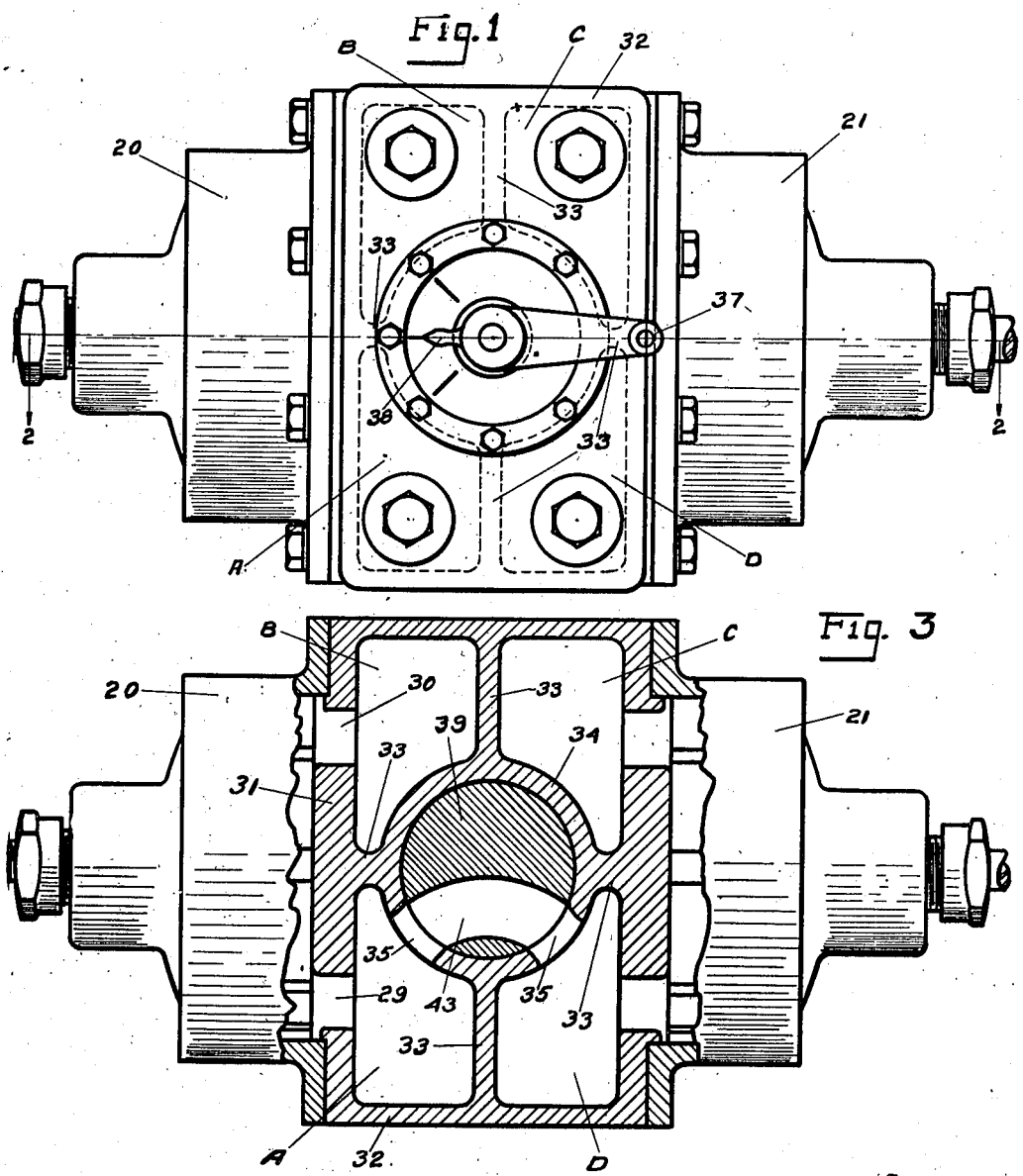

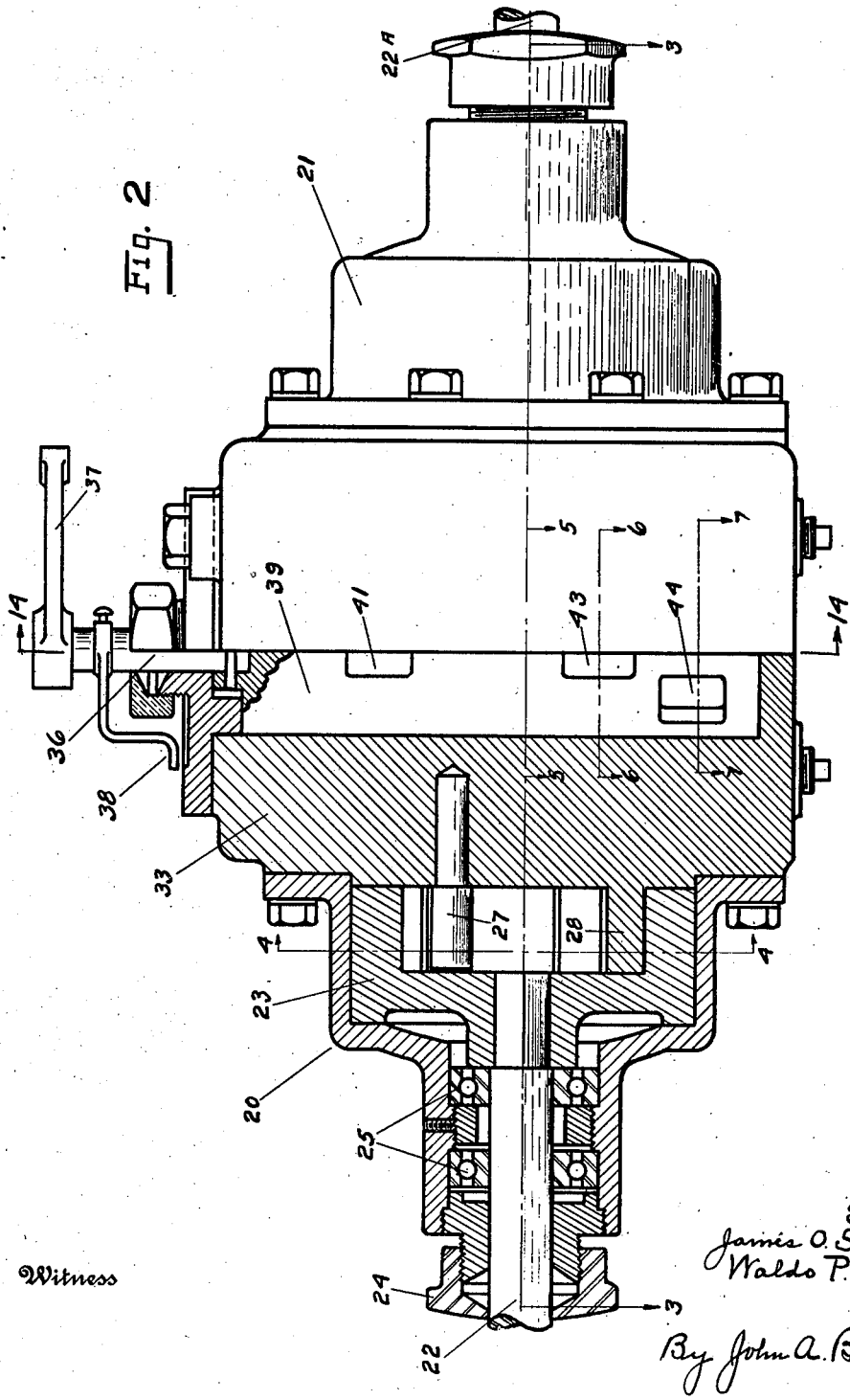

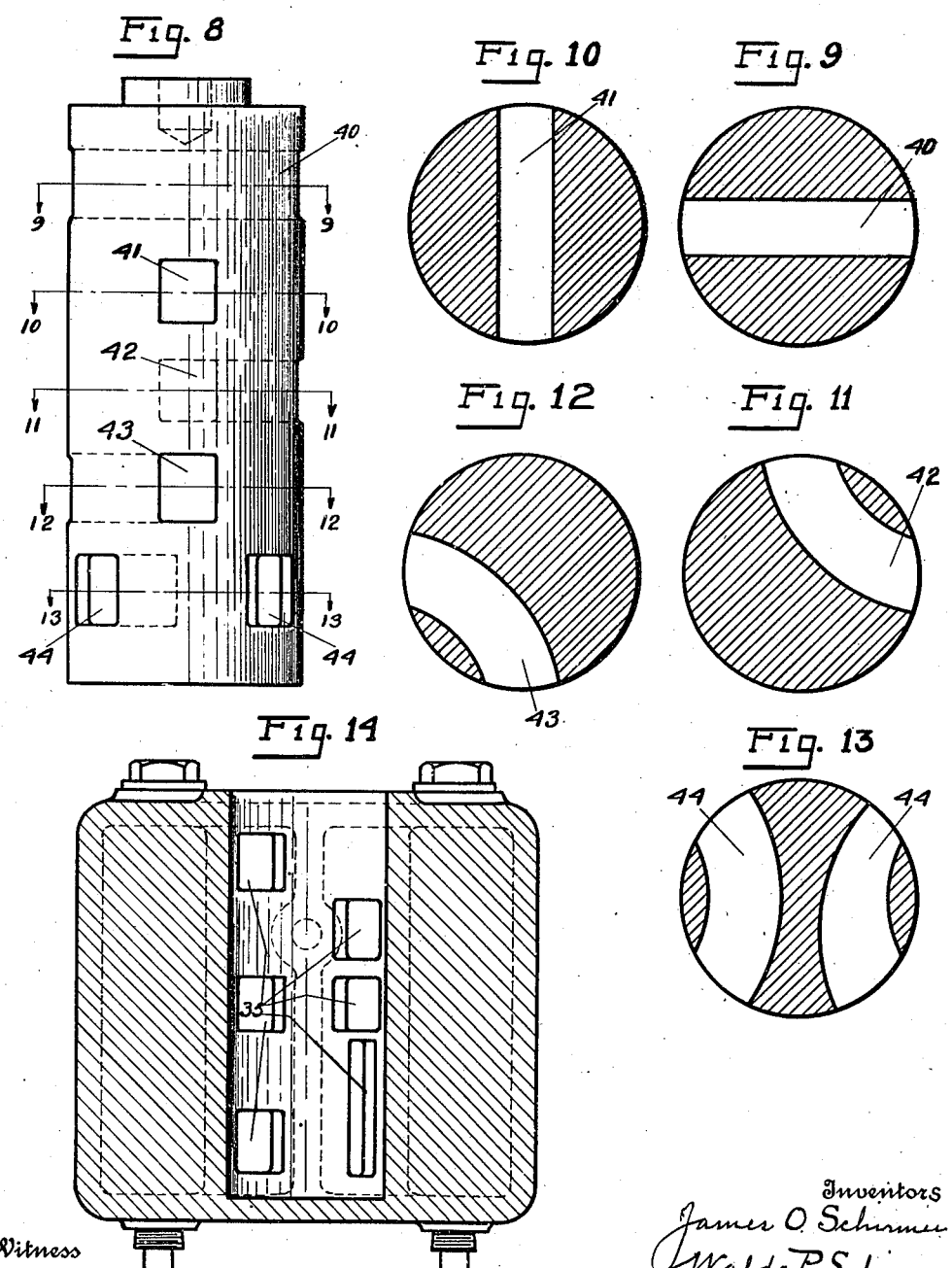

UNITED STATES PATENT OFFICE.

JAMES O. SCHIRMER AND WALDO P. SCHIRMER, OF CLEVELAND, OHIO.

FLUID TRANSMISSION OR DRIVING MECHANISM.

1,292,091.  Specification of Letters Patent.  Patented Jan. 21, 1919.

Application filed September 6, 1918. Serial No. 252,824.

*To all whom it may concern:*

Be it known that we, JAMES O. SCHIRMER, and WALDO P. SCHIRMER, citizens of the United States, residing at Cleveland, in the county of Cuyahoga and State of Ohio, have invented certain new and useful Improvements in Fluid Transmissions or Driving Mechanisms, of which the following is a specification.

This invention relates to fluid transmissions or driving mechanisms, of the pump and motor type, in which rotation is transmitted between two shafts or the like, in either direction, by means of a rotary pump and a motor with an interposed controlling valve which determines or controls the direction of flow from the pump to the motor.

The object of the present invention is to simplify and improve transmissions of this type, a feature of the invention being the use of a single valve which may be turned to control the speed, to permit coasting or free running, or to change the direction of rotation.

In devices of this kind the fluid is inclosed in a casing and in the present instance the casing includes the pump and motor casings and an intermediate valve casing joined thereto, and this valve casing includes four compartments connected by suitable ports to the inlet and outlet sides of the pump and motor respectively, and also a multiple way valve, by proper manipulation of which the chambers can be connected with each other so as to permit the fluid to flow in desired direction from the pump to the motor and back again, or, when the valve is set in neutral position the communication between the pump and motor is closed, and the fluid is by-passed from the outlet to the inlet sides of the pump and the motor respectively, the latter permitting the pump and the motor to operate independently of each other, which will avoid the use of any clutch device as well as permitting coasting or continued rotating in either direction, due to momentum of the parts until stopped by friction.

A feature of the invention is a single rotary or oscillating valve which controls the passage of the fluid in all directions necessary to accomplish different directions of rotation, change of speed or neutral conditions.

The invention will be found particularly useful between the engine and propeller shafts of motor vehicles and boats, and will enable the power transmission to be quickly and effectively changed.

We are aware that a transmission involving a pump and a motor driven thereby, with interposed controlling devices or valves, has been heretofore proposed, and the present invention therefore resides in the simplicity of the structure involving these elements, and in the particular manner of controlling the fluid in its passage through the device.

In the accompanying drawings:

Figure 1 is a plan view of a transmission embodying the invention.

Fig. 2 is a half section and elevation on the line 2—2 of Fig. 1.

Fig. 3 is a partial section on the line 3—3 of Fig. 2.

Fig. 4 is a half section and end elevation on the line 4—4 of Fig. 2.

Figs. 5, 6 and 7 are details in section of the valve on the lines 5—5, 6—6 and 7—7 of Fig. 2.

Fig. 8 is a side elevation of the valve removed from the casing.

Figs. 9, 10, 11, 12 and 13 are sections on the respective lines 9—9 to 13—13 of Fig. 8.

Fig. 14 is a section on the line 14—14 of Fig. 2.

The pump and motor are similarly constructed, and the other parts are symmetrical so that either end may be used as the driving end. As shown, we have indicated the pump end casing at 20 and the motor end casing at 21. The description of the internal parts of one will answer for both. The rotary pump or motor is of a known type, and includes a shaft 22, designated as the driving shaft, which drives a rotary toothed impeller 23, the shaft extending through the gland 24 and being mounted in bearings 25, and the impeller rotating in the circular casing 20. The internal teeth of this impeller mesh with the teeth of a star or gear wheel 26 which turns on a stud 27 eccentric to the axis of the casing, with a partition 28 between the discharge and inlet sides of the pump, or motor as the case may be. The inlet or suction port of the pump is indicated at 29 and the discharge port at 30. These ports are located in the inner end wall of the pump casing which wall also constitutes the outer end wall of the intermediate valve casing and chambers, this wall being indicated at 31. The pump casing 20 is bolted to this wall at one end of the device and it will be understood that the motor casing 21 is bolted to the opposite end in a similar manner, the driven shaft being indicated at 22ª.

The intermediate casing is indicated as a whole at 32 and comprises a block in which are four compartments, A, B, C, and D, occupying the four corners of the block and separated by radial walls or partitions 33 at right angles to each other. These partitions radiate or extend from a central cylindrical-valve casing 34, the axis of which intersects the axis of the shafts at a perpendicular, and the valve casing is provided with a series of ports connecting the valve with the respective chambers, A, B, C and D. These ports are indicated at 35. These ports are twelve in number, or three to each compartment, and are located in position to correspond with the ports in the rotary valve now to be described.

This valve is shown in Fig. 8 and is of the plug type. It is located in the casing 34 and is provided with a stem 36 and a handle 37 whereby it may be turned in either direction to the three positions of forward, neutral or reverse. 38 is a pointer to indicate the position of the valve.

The valve body 39 has an upper diametrical port 40 which is closed when the valve is in neutral position, and which connects the chambers B and D when the valve is in forward drive position, through appropriate ports 35 in the valve casing.

Next below the port 40 is a diametrical port 41 through the valve at a right angle to the port 40 and which connects the chambers A and C when the valve is in forward drive position.

Below the port 41 is a curved or quartering port 42 in the valve, which connects the chambers B and C when in reverse position.

Below the port 42 is a quartering port 43 which connects the chambers A and D when in reserve position.

Finally at the lower end of the valve is a pair of quartering ports 44 which connect the chambers A and B, and C and D respectively, when the valve is in neutral position. The ports 35 in the valve casing wall are located in proper position to register selectively with the ports in the valve in said different positions, the ports in the valve being closed by the adjacent wall of the valve casing, when in other positions.

The pump and valve casings will be filled with oil, water or other fluid, as will be understood. In operation, starting with the neutral or coasting position, the ports 44 will be open and all other ports will be closed, as shown in Figs. 5, 6 and 7. Then the pump in the casing 20 will draw the fluid from chamber A, discharge the same into the chamber B and it will by-pass back through one of the ports 44 into the chamber A, and no power will be transmitted. If the driving shaft 22ª is rotating in consequence of momentum or otherwise, the fluid in the motor end of the apparatus will by-pass through the other port 42 from the chamber C to the chamber D.

For the forward drive, the valve is turned clock-wise forty five degrees (45°). The flow is then from the chamber A through the pump to the chamber B, through the port 40 from the chamber B to the chamber D, then through the motor which it drives, then into the chamber C and from the chamber C through the port 41 to the chamber A, the other ports being closed.

For reverse drive, the valve is shifted forty-five (45°) degrees from neutral, in counter clockwise direction. Then the flow is from chamber A through the pump to the chamber B, through port 42 to the chamber C, through the motor in reverse direction and into chamber D, and then through the port 43 back to chamber A, the other ports being closed.

For changes of speed, the valve is partly turned in either direction and more or less of the fluid will then flow through the by-pass ports 44, the rest flowing through one set or the other of the power ports, as above described, both sets of ports, that is, power and neutral being partly open.

By the means described, therefore, power can be transmitted from the driving to the driven shaft, through the fluid transmission in either direction and at various speeds, all being controlled by a single valve associated with two pairs of compartments, each pair of which communicates with opposite sides of the pump and motor respectively.

We claim:

1. In a fluid transmission, the combination with a rotary pump and a rotary motor coaxial therewith, of an intervening casing intersecting the axis of the pump and motor and containing two pairs of chambers communicating respectively with the inlet and outlet sides of the pump and motor respectively, said chambers being arranged in radial position around the center of the casing, and a single valve located centrally in said casing and selectively controlling the flow between said chambers.

2. In a fluid transmission, the combination with a rotary pump and a rotary motor, of an intervening casing, located between the pump and the motor, the end walls of the casing forming end walls of the pump and motor casings respectively, said intervening casing having four chambers radially arranged around the center of the casing, two of said chambers being connected to opposite sides of the pump and the other two being connected to opposite sides of the motor, and a valve at the central part of said casing, having through ports selectively controlling the flow between said chambers.

3. In a fluid transmission, the combination with a pump and a motor, of an intervening casing therebetween, said casing containing four radially arranged fluid chambers and a central valve chamber, two of the fluid chambers being connected to opposite sides of the pump respectively, and the other two being connected to opposite sides of the motor respectively, said chambers having ports communicating with the valve chamber, and a single valve in said chamber, controlling said ports, said valve having ports arranged to connect the chambers at either the opposite or the same sides of the pump and motor.

4. In a fluid transmission, the combination with a pump and a motor, of an intervening casing therebetween, said casing containing four radially arranged fluid chambers and a central valve chamber, two of the fluid chambers being connected to opposite sides of the pump respectively, and the other two being connected to opposite sides of the motor respectively, said chambers having ports communicating with the valve chamber, and a single valve in said chamber, controlling said ports, said valve having ports arranged to connect the chambers at either the opposite or the same sides of the pump and motor, and also having ports arranged to by-pass fluid between opposite sides of the pump and motor respectively.

5. In a fluid transmission, the combination with a coaxial rotary pump and motor, of a single valve and its casing, between the pump and the motor and intersecting the axis thereof, said valve having passages arranged to connect the chamber and motor in either direct or reverse flow through the motor, and also having by-pass passages arranged to connect opposite sides of the pump and of the motor, respectively.

6. In a fluid transmission, the combination of a pump and a motor and their casings, an intervening casing secured directly to said casings in supporting relation between the same, and a single valve in the intervening casing, having ports controlling the flow from the pump to the motor and also having by-pass ports arranged to connect opposite sides of the pump and of the motor, respectively.

In testimony whereof, we do affix our signatures in presence of two witnesses.

JAMES O. SCHIRMER.
WALDO P. SCHIRMER.

Witnesses:
JOHN A. BOMMHARDT,
W. J. MARTIN.